Patented Jan. 2, 1940

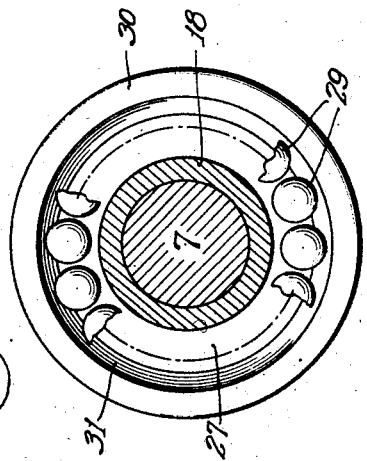
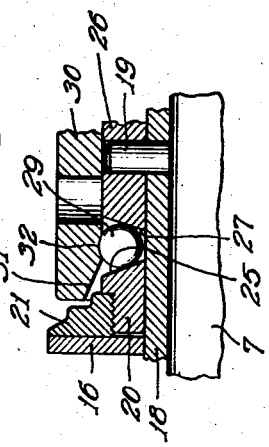
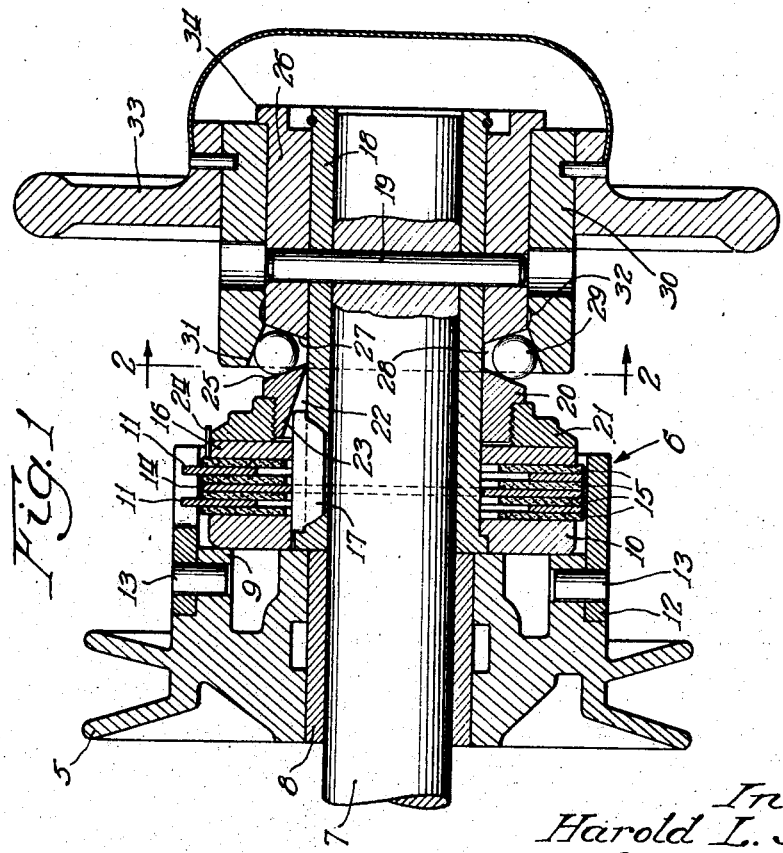
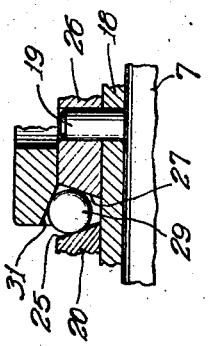
Jan. 2, 1940. H. L. SCHERER 2,185,714
CLUTCH
Filed June 2, 1938
Inventor:
Harold L. Scherer
By Edward C. Gritzbaugh
Atty.

2,185,714

UNITED STATES PATENT OFFICE 2,185,714

CLUTCH

Harold L. Scherer, Rockford, Ill., assignor to Borg-Warner Corporation, Chicago, Ill., a corporation of Illinois Application June 2, 1938, Serial No. 211,336

4 Claims. (Cl. 192—93)

My invention relates to clutches of the type commonly known as "industrial clutches," used in connection with industrial machines, such as lathes, drill presses, etc., for connecting such a machine to its source of power, and has as its object to provide an improved clutch of this type that is of relatively simple, durable and inexpensive construction, yet efficient and sure in operation.

The invention contemplates, for the attainment of these general objects, a clutch in which axial movement of a member for transmitting packing thrust to the clutch plates, is secured by forcing a plurality of wedging elements radially inwardly in contact with such thrust transmitting member, by means of an axially movable shipper including a sleeve adapted to exert a camming action against such wedging elements. It is intended that the shipper sleeve may remain in operative relation to the wedging elements so as to lock the clutch in engagement until released by manual retraction of the sleeve. For manipulation of the sleeve, a handwheel is attached to the sleeve, whereby the sleeve may be advanced to or backed off of operative engagement with the wedging elements.

The chief object of the invention is to provide an arrangement of this kind in which the shipper may function to lock the wedging elements in clutch-engaging position and yet be freely rotatable with respect to the remainder of the clutch mechanism, so that the operator, in the case of a hand-operated assembly, may grasp the handwheel and stop its rotation preparatory to utilizing it for the shifting manipulation, without burning his hands during the process. In attempting to perfect a satisfactory arrangement of the type under consideration, the tendency of the shipper to rotate with the parts associated with it, has constituted a definite problem, both as to hand-operated and fork-operated shippers.

Other objects, the advantages and uses of the invention will become apparent after reading the following specification and claims, and after consideration of the drawing forming a part of the specification, wherein:

Fig. 1 is an axial sectional view of a clutch assembly embodying the invention;

Fig. 2 is a transverse sectional view of the same taken on the line 2—2 of Fig. 1;

Fig. 3 is a fragmentary axial sectional view illustrating the parts in clutch-engaged position; and Fig. 4 is a fragmentary axial sectional view of a somewhat modified form of the invention.

As an illustration of one form in which the invention may be embodied, I have shown in Fig. 1 the clutch mechanism of a conventional metal working lathe. Power from a conventional electric motor, for example, is transmitted to the pulley 5, and thence, through the medium of the clutch plate assembly 6, to the operating shaft 7 of the lathe.

The pulley 5 may be rotatably mounted on the shaft 7 through the medium of a bearing bushing 8. On one side, it may be formed with an abutment flange 9 adapted to back up the thrust plate 10 of the clutch plate assembly 6.

The clutch plate assembly 6 includes one or more driving plates 11, which are keyed to a driving cup 12 encircling and secured to the flange 9 as by means of pins 13, a driven plate 14, a plurality of friction discs 15 of friction material, such as an asbestos composition, and a pressure plate 16 adapted to transmit packing pressure to the plate assembly. The discs 15 are interposed between the plates 11 and 14.

The driven disc 14 is keyed, as by means of a key 17, to a sleeve 18 which in turn is secured upon the shaft 7 as by means of a pin 19. When the clutch is engaged, power is transmitted from the pulley 5 to the drive discs 11, thence through the friction discs 15 to the driven disc 14 and pressure plate 16, thence through the sleeve 18 to the shaft 7.

Axial pressure for packing the clutch is applied to a pressure-receiving ring 20 which is adjustably associated with the pressure plate 16 through the medium of an adjustment collar 21. The pressure receiving ring 20 is provided with an axial slot 22 which receives one corner of the key 17, whereby it is held against rotation. It has a reduced threaded portion 23 threaded into the adjustment collar 21. By rotating the collar 21, the axial position of the thrust-transmitting ring 23 with relation to the pressure plate 16, may be adjusted. A locking pin 24 is provided for the purpose of locking the adjustment collar 21 in any of its adjusted positions.

The thrust-transmitting ring 20 has a smooth end face 25 forming a bearing surface. Secured upon the sleeve 18 by means of the pin 19 is a thrust sleeve 26 which likewise has a smooth end face 27 forming a bearing surface. Between the end faces 25 and 27 is formed an outwardly flaring ball race groove 28, at least one of the end faces 25 and 27, and preferably both, being conical. In the groove 28 are received a plurality of steel bearing balls 29 functioning as wedging elements.

When the clutch is disengaged, the balls 29 are adapted to engage the conical faces 25 and 27 while spaced radially outwardly from the surface of the sleeve 18, as shown in Fig. 1.

Clutch engagement is effected by forcing the thrust ring 20 axially away from the thrust sleeve 26. To this end, the balls 29 are forced inwardly by means of a shipper sleeve 30 which is rotatably mounted upon the thrust sleeve 26. The shipper sleeve 30 has an internal, outwardly flaring conical bearing face 31, which, in the disengaged position of the clutch, is associated with the balls 29, as shown in Fig. 1, so as to allow the balls to freely rotate between the conical faces 25 and 27, and the thrust members 20 and 26, without exerting wedging pressure therebetween. By advancing the shipper sleeve 30 axially to the position shown in Fig. 3, the balls 29 are forced radially inwardly, exerting a wedging action between the faces 25 and 27, and thus moving the thrust ring 20 forwardly so as to apply packing pressure to the clutch plates 11, 14 and 15 through the pressure plate 16.

Although the sleeve 30 may have a smooth cylindrical bore adjacent the conical cam face 31, as shown in Fig. 4, adapted to engage the balls 29 when the sleeve is in clutch-engaging position, it is preferred to employ, in the interior face of the sleeve adjacent the cam face 31, a toroidal locking groove 32 adapted, when the sleeve is advanced to clutch-engaging position, to receive the balls 29, as shown in Fig. 3, whereby to lock the shipper sleeve against retraction until it is manually retracted.

Mounted upon the shipper sleeve 30 is a handwheel 33 adapted to be grasped by the hands of the operator for manipulating the shipper.

The fixed thrust sleeve 26 has at its end opposite the conical face 27, a radially outwardly extending flange 34 against which the shipper sleeve 30 may abut when in its retracted position shown in Fig. 1. The flange 34 serves to retain the shipper sleeve against escaping from the end of the sleeve 26, and maintains it in its inoperative position in close association with the balls 29. Owing to the fact that the conical faces 25 and 27, and the locking groove 32 form a raceway in which the bearing balls 29 may freely revolve, it is possible for the operator to grasp the handwheel 33, while revolving with the remainder of the mechanism in the clutch-engaged arrangement of the parts, and to stop its rotation with sufficient ease to avoid burning his hands. The thrust ring 20 and thrust sleeve 26 may continue to revolve as the shipper sleeve 30 becomes stationary, and the bearing balls 29 will simply rotate between the grooves 27 on the one hand, and the groove 32 on the other.

The back pressure of the clutch against the thrust ring 20, transmitted to the balls 29, will maintain the latter in secure engagement with the locking groove 32 so as to securely retain the shipper sleeve in its advanced, clutch-engaging position until it is backed off by manual pressure.

I find that the most satisfactory angle to employ in connection with the faces 25, 27 and 31, is 20 degrees. Accordingly, it is preferred to form all of them at this angle. It will be understood, however, that other angles may be successfully employed, and the angles need not necessarily be equal. For example, one of the faces 25 and 27 could be arranged at a different angle than that of the other, and could be, if desired, perpendicular to the axis of the clutch, providing, of course, that the other of said faces were inclined sufficiently to give the desired range of movement.

In any event, the invention has the advantage of very materially reducing the driving reaction against the shifting means, whether it be in the from of a handwheel or a clutch collar, thereby reducing friction and its attendant wear, and making the shift a smoother, easier operation.

I claim:

1. In a clutch, a pair of coaxial annular thrust transmitting members having axially separated end faces defining between them a radially outwardly flaring annular groove, means on which one of said members is fixed and the other is axially movable so as to transmit packing pressure to friction clutching elements, a shipper sleeve freely rotatable on one of said members and having a hand wheel for manual engagement by the hands of an operator, a plurality of bearing balls arranged in said annular groove, said shipper sleeve having an internal conical face adapted to engage the radially outer extremities of said bearing balls and, when moved axially, to force said bearing balls inwardly so as to exert a wedging action between said conical faces, whereby to spread said thrust members axially and to thereby establish clutch engagement, said shipper sleeve being provided, adjacent its conical face, with an internal toroidal groove adapted, when in its advanced clutch engaging position, to receive said bearing balls and to be held against retraction by the engagement of said balls in said groove and at the same time to be freely rotatable with respect to said thrust members so as to allow the operator to stop the rotation of said hand wheel with a minimum of effort.

2. In a clutch, coaxial annular thrust members having axially spaced end faces defining between them an outwardly flaring annular groove, means on which one of said members is fixed and on which the other of said members is axially slidable so as to transmit packing pressure to friction clutching elements, a shipper sleeve freely rotatable on one of said members so as to receive a minimum of driving torque therefrom, said sleeve being provided with a hand wheel adapted to be engaged by the hands of an operator, and having an internal conical face, and bearing balls arranged in said groove the latter being adapted, when the shipper sleeve is moved axially, to force said bearing balls radially inwardly whereby to spread said thrust members and produce clutch engagement, said internal conical face maintaining said balls in position for immediate effective operation at all times.

3. In a clutch, a pair of coaxial thrust members having axially separated end faces defining between them an outwardly flaring annular groove, means upon which one of said members is secured and on which the other of said members is axially slidable so as to transmit packing pressure to friction clutch elements, one of said members having at its end opposite said annular groove a radially outwardly extending flange, a shipper sleeve freely rotatable on said last mentioned member between said flange and said groove, and having a hand wheel adapted to be grasped by the hands of the operator, and bearing balls arranged in said groove, said shipper sleeve having an internal conical face maintained in constant close association with said bearing balls by the engagement of the other end of said sleeve against said flange, said conical face being adapted when the sleeve is moved axially, to force said balls inwardly and thereby spread said thrust members so as to produce clutch engagement, said shipper sleeve being provided, adjacent its conical face, with an internal toroidal groove adapted, when in its advanced clutch engaging position, to receive said bearing balls and to be held against retraction by the engagement of said balls in said groove and at the same time to be freely rotatable with respect to said thrust members so as to allow the operator to stop the rotation of said hand wheel with a minimum of effort.

4. In a clutch, a pair of coaxial annular thrust transmitting members having axially separated end faces defining between them a radially outwardly flaring annular groove, means on which one of said members is fixed and the other is axially movable so as to transmit packing pressure to friction clutching elements, a shipper sleeve freely rotatable on one of said members, a plurality of bearing balls arranged in said annular groove, said shipper sleeve having an internal conical face adapted to engage the radially outer extremities of said bearing balls and, when moved axially, to force said bearing balls inwardly so as to exert a wedging action between said conical faces, whereby to spread said thrust members axially and to thereby establish clutch engagment, said shipper sleeve being provided, adjacent its conical face, with an internal toroidal groove adapted, when in its advanced clutch engaging position, to receive said bearing balls and to be held against retraction by the engagement of said balls in said groove and at the same time to be freely rotatable with respect to said thrust members.

HAROLD L. SCHERER.